US012105783B2

(12) United States Patent
Jayaraman

(10) Patent No.: US 12,105,783 B2
(45) Date of Patent: Oct. 1, 2024

(54) SYSTEMS AND METHODS FOR AGGREGATED AUTHENTICATED DATA STORAGE

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 220 days.

(21) Appl. No.: 18/053,932

(22) Filed: Nov. 9, 2022

(65) Prior Publication Data

US 2024/0152589 A1 May 9, 2024

(51) Int. Cl.
G06F 21/00 (2013.01)
G06F 21/32 (2013.01)

(52) U.S. Cl.
CPC .................... G06F 21/32 (2013.01)

(58) Field of Classification Search
CPC ....................................................... G06F 21/32
See application file for complete search history.

(56) References Cited

U.S. PATENT DOCUMENTS

| | | |
|---|---|---|
| 2009/0276368 A1 | 11/2009 | Martin |
| 2010/0100416 A1 | 4/2010 | Herbrich |
| 2010/0299286 A1 | 11/2010 | Dilip |
| 2011/0270779 A1 | 11/2011 | Showalter |
| 2015/0379488 A1* | 12/2015 | Ruff ....................... G06Q 40/06 705/40 |
| 2017/0126581 A1 | 5/2017 | Wadley |
| 2020/0327604 A1 | 10/2020 | Morin |
| 2021/0360077 A1 | 11/2021 | Bandari |
| 2021/0390573 A1* | 12/2021 | Reedy ..................... G06N 20/00 |
| 2023/0080249 A1* | 3/2023 | Prendergast ....... G06Q 20/4037 705/75 |
| 2024/0094960 A1* | 3/2024 | Dunjic .................. G06F 3/0631 |

OTHER PUBLICATIONS

Popovic et al., "Cloud computing security issues and challenges", The 33rd International Convention MIPRO, Date of Conference: May 24-28 (Year: 2010).*

* cited by examiner

*Primary Examiner* — Morshed Mehedi
(74) *Attorney, Agent, or Firm* — Michael A. Springs, Esq.; Shumaker, Loop & Kendrick, LLP; Patrick B. Horne

(57) ABSTRACT

Systems and methods include program instructions to predict that a user will utilize external source(s) to transfer at least one resource into an entity-based record. The program instructions obtain identifying information data about the external source(s), the identifying information data including user-specific authentication information data, and automatically populate one or more data entries of a virtual aggregation table that is configured to store data records of external source identification information, where the automatically populating includes storing the obtained identifying information data about the external source(s). The program instructions also determine that a user is accessing an entity-based digital platform to access optional sources for making a resource transfer. Additionally, the program instructions display, via a user interface of a user device, an aggregation of optional external sources each optional external source having a selectable input associated therewith.

20 Claims, 11 Drawing Sheets

SYSTEMS AND METHODS FOR AGGREGATED AUTHENTICATED DATA STORAGE

FIELD OF THE INVENTION

This invention is related generally to the field of data aggregation, and more particularly embodiments of the invention relate to aggregated authenticated data storage.

BACKGROUND OF THE INVENTION

Various entities allow users to perform real-world financial transactions via an online digital platform. Example online digital platforms includes websites and software applications. It is common for users to make financial transfers online by logging in to a financial entity's website to transfer funds from one entity to another. For instance, users may have bank accounts set up with multiple financial institutions and may transfer funds from one bank account to another. Customers have various reasons for wanting to transfer funds from a bank account with one financial entity to a bank account with another financial entity. For example, customers may have accounts with regional banks, national banks, credit unions, etc. and may want to move money from one entity to another.

In order to make a transfer from one entity to another it can be cumbersome and inefficient to manually input information for each respective financial institution every time the user wants to make a transfer. A user may not have account information readily available to be able to make the financial transfer or a user may incorrectly input account information needed to make the financial transfer. Therefore, a need exists in the art for systems and methods of simplifying the financial transfer process.

BRIEF SUMMARY

Shortcomings of the prior art are overcome and additional advantages are provided through the provision of a computing system for aggregated authenticated data storage. The system includes, for instance, a memory, one or more processors in communication with the memory, and program instructions executable by the one or more processors via the memory. The program instructions, in part, predict that a user will utilize one or more external sources to transfer at least one resource into an entity-based record. Further, the program instructions obtain identifying information data about the one or more external sources, the identifying information data including user-specific authentication information data. The program instructions automatically populate one or more data entries of a virtual aggregation table that is configured to store data records of external source identification information, the automatically populating including storing the obtained identifying information data about the one or more external sources. Additionally, the program instructions determine that a user is accessing an entity-based digital platform to access optional sources for making a resource transfer. The program instructions also display, via a user interface of a user device, an aggregation of optional external sources, each optional external source of the optional external sources having a selectable input associated therewith.

Additionally, disclosed herein is a computing system for aggregated authenticated data storage. The system includes a memory, one or more processors in communication with the memory, and program instructions executable by the one or more processors via the memory. The program instructions transmit, to a receiver of a computing device that is connected to the computing system via a network, a request to access stored identifying information data about one or more external sources. Further, the program instructions predict that a user will utilize at least one external source of the one or more external sources to perform a resource transfer, the predicting including (i) determining that the user has a resource account with the at least one external source, and (ii) determining that the at least one external source has deposited therewith one or more resources to perform the resource transfer.

Also disclosed herein is a computer-implemented method for aggregated authenticated data storage. The computer-implemented method includes predicting that a user will utilize one or more external sources to transfer at least one resource into an entity-based record. Additionally, the method includes obtaining identifying information data about the one or more external sources, the identifying information data including user-specific authentication information data. Also, the method automatically populates one or more data entries of a virtual aggregation table that is configured to store data records of external source identification information, the automatically populating including storing the obtained identifying information data about the one or more external sources. Further, the method includes determining that a user is accessing an entity-based digital platform to access optional sources for making a resource transfer, and displaying, via a user interface of a user device, an aggregation of optional external sources, each optional external source of the optional external sources having a selectable input associated therewith.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1A:
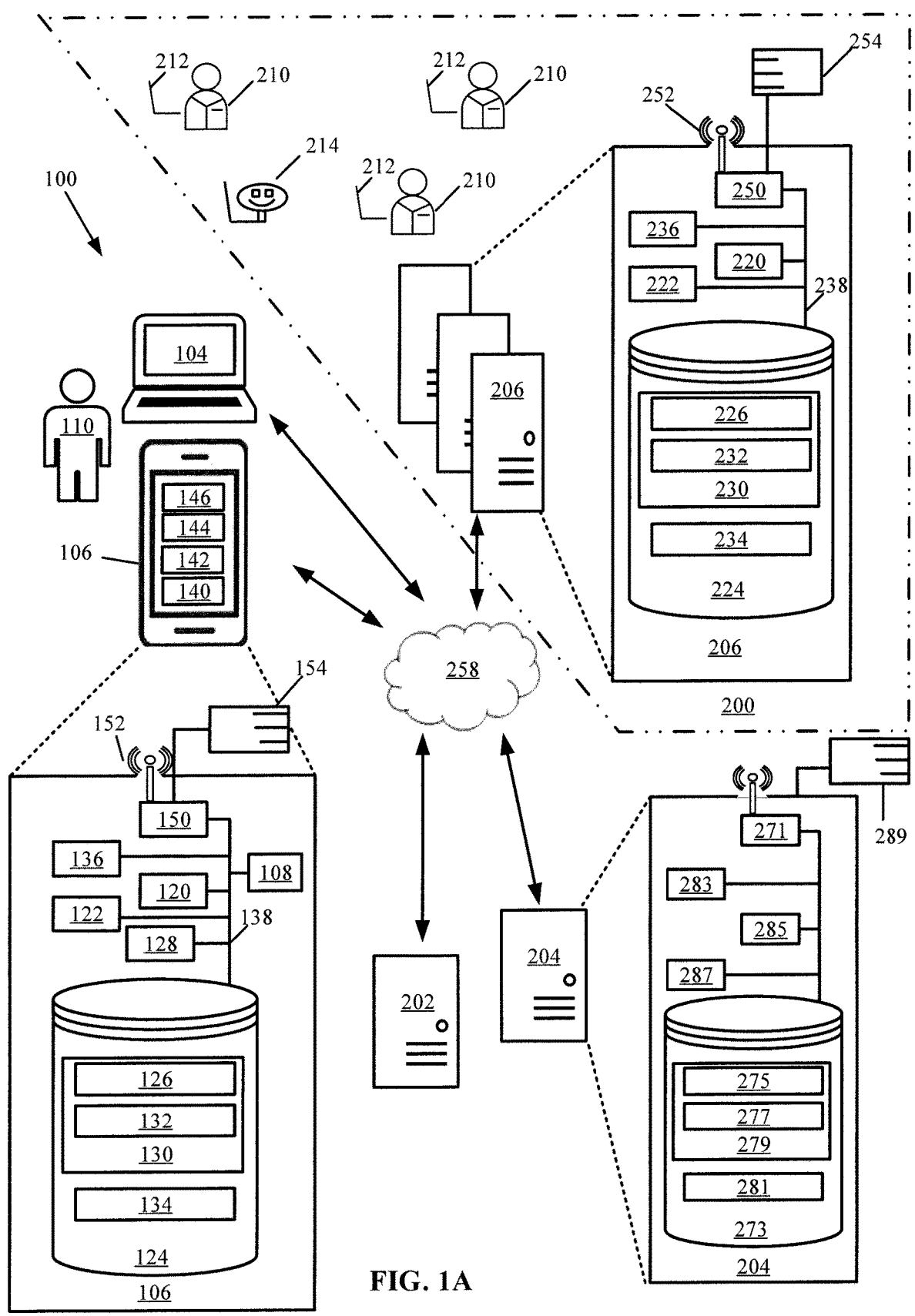
FIG. 1A illustrates an example enterprise system and environment thereof for data aggregation incorporating authentication data, in accordance with an embodiment of the present invention.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code.

FIG. 1A illustrates a system 100 and environment thereof, according to at least one embodiment, by which a user 110 benefits through use of services and products of an enterprise system 200. The environment may be, for example, a distributed cloud computing environment or the like. The user 110 accesses services and products by use of one or more user devices illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, server computer systems, multiprocessor systems, microprocessor-based systems, programmable consumer electronics, or any combination of the aforementioned, or other device (portable or stationary) with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 106 and computing device 104, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device 104, 106, as illustrated with reference to the mobile device 106 but could be computing device 104, includes components such as, for example, at least one of each of a processing device 120, and a memory device 122 for processing use, such as volatile memory that temporarily stores files such as random access memory (RAM), and non-volatile memory that permanently stores instructions such as read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, authentication information (e.g., libraries of data associated with authorized users), files downloaded or received from other devices, calendar information data, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory such as read-only memory (ROM), which can be embedded and/or may be removable. The non-volatile memory can additionally or alternatively include an electrically erasable programmable read-only memory (EEPROM), flash memory or the like.

According to various embodiments, the memory device 122 and the storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device 104, 106 and the applications and devices that facilitate functions of the user device 104, 106, or are in communication with the user device 104, 106, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120.

The input and output system 136 may also include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120.

The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The display 140 may be operatively connected to display circuitry, such as display driver circuitry, which may facilitate displaying content via the display 140. The user output devices may include a speaker 144 or other audio device.

The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera. Further non-limiting examples of include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device (referring to either or both of the computing device 104 and a mobile device 106). Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The user device 104, 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface that is operative to provide a data transfer path and that connects the processing device 120 to the memory device 122, individual electrical connections among the components, and electrical conductive traces on a motherboard common to some or all of the above-described components of the user device 104, 106. As discussed herein, the system intraconnect 138 may operatively couple various components with one another, or in other words, electrically connects those components, either directly or indirectly—by way of intermediate component(s)—with one another.

The user device (referring to either or both of the computing device 104 and the mobile device 106) with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

Communication circuitry of the wireless communication device 152 may simultaneously perform several communication operations using different combinations of communication networks. For example, the communication circuitry may include any circuitry necessary to support Wi-Fi (e.g., a 802.11 protocol), Ethernet, Bluetooth© (is a registered trademark owned by Bluetooth SIG, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The user device 104, 106 may be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. The user device 104, 106 may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. User device 104, 106 may enable users to input any number or combination of authentication systems.

The user device 104, 106 may associate particular resources with one or more authentication systems and may use, according to various embodiments, various types of authentication systems to prevent unauthorized access to the particular resources.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the mobile device 106 in FIG. 1 applies as well to one or both of the computing device 104, and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device 104, 106.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices (referring to either or both of the computing device 104 and mobile device 106) the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device 104, 106. Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), and community cloud (i.e., cloud-based infrastructure shared by several organizations and manages by the organizations or third parties and hosted on-premises or off premises), hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 104, 106 during transactions and also configured to interact with the enterprise system 200 in back-end transactions clearing processes. According to various embodiments, the external systems may include credit reporting agency systems that perform financial credit reporting.

According to various embodiments, the external systems 202, 204 may utilize various service models (e.g., PaaS, IaaS, and/or SaaS) to host applications that may be designed for specific external systems 202, 204. According to various embodiments, the external systems 202, 204 may also include various components similar to the user device 104, 106. For instance, as illustrated with the external system 204, the components may include a processing device 285, a memory device 287, an output system 283, a communication interface 271, a connector 289, a storage device 273, data items 281, applications or programs 279 such as application 277, and computer-readable instructions 275, and/or various other components which may perform similar functionalities and/or include similar attributes as the corresponding components described with reference to the user device 104, 106 or computing system 206.

In certain embodiments, one or more of the systems such as the user device 104, 106, the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed. Various virtual resources may include virtual servers, virtual storage, virtual networks (e.g., virtual private networks (VPN)), virtual applications and operating systems, and virtual clients.

Figure 1B:
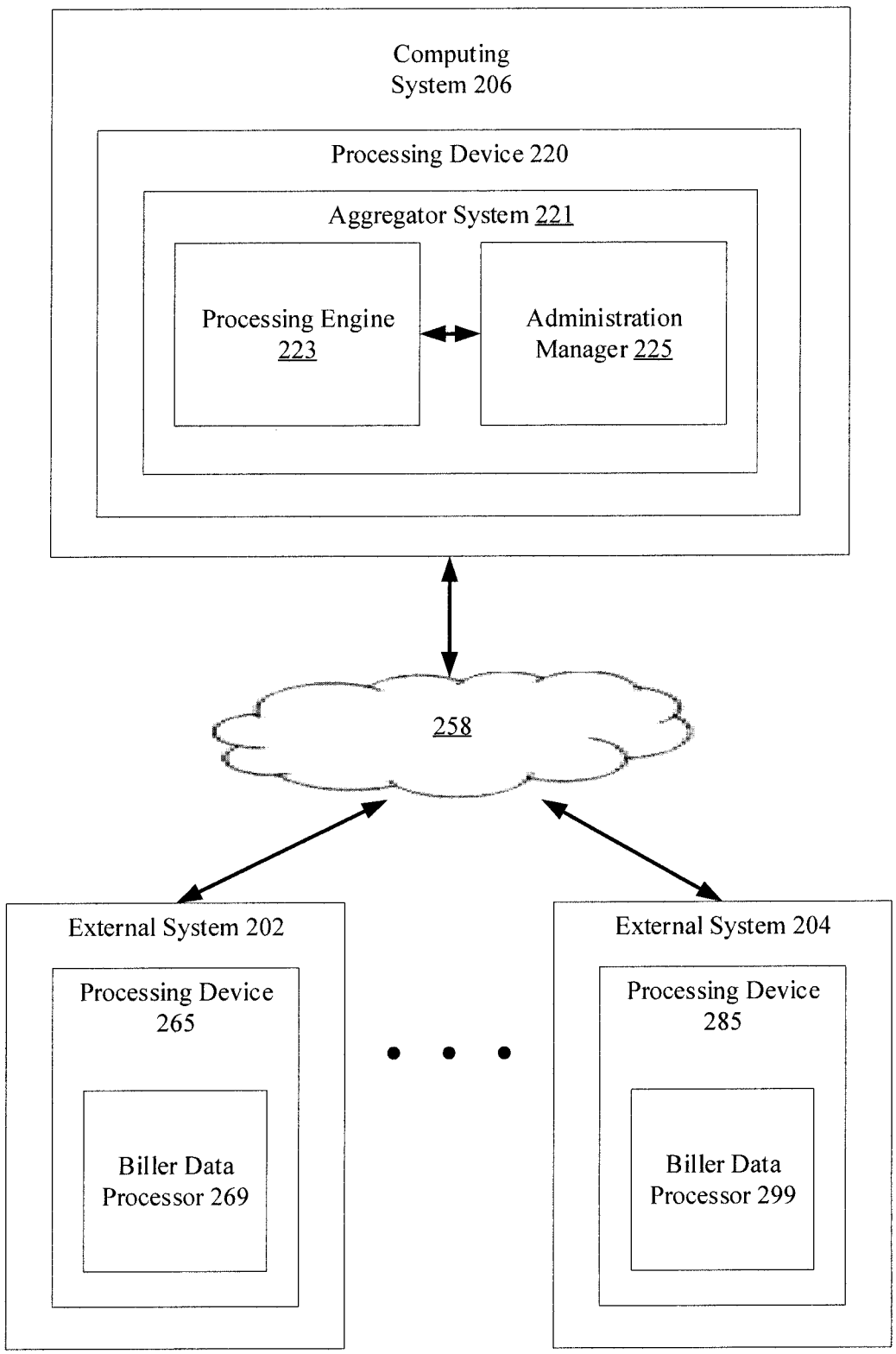
FIG. 1B depicts various example computing systems that are in communication for data aggregation incorporating authentication data, in accordance with an embodiment of the present invention.

Referring now to FIG. 1B, various example computing systems, specifically computing system 206, external system 202, and external system 204 are in communication for data aggregation incorporating authentication data are depicted, in accordance with an embodiment of the present invention. According to one embodiment, various external systems (e.g., external system 202 and external system 204) are or may include a payment processor entity to facilitate processing of financial data related to various financial transactions. For example, the external systems illustrated as external system 202 and external system 204 may process electronic financial instruments such as credit cards, electronic checks, cash transactions, or various other financial transactions. In particular, computing system 202 includes a processing device 265, which is a data processor that includes a biller data processor 269 configured to process financial-related data associated with payment-related requests (e.g., payments, requests to void transactions, cancellations, escrow requests, etc.). The external system 202 may be associated with a third-party provider (e.g., a billing entity) that the user (e.g., user 110) is required or desirous to pay due to, for example, a debt, a routine service charge, a usage-based charge, etc. related to various goods or services. According to one embodiment, external system 202 may be associated with a different third-party provider than that of external system 204. For example, external system 204 may be associated with a financial entity (e.g., a bank) where a user wants to transfer funds from and may include a processing device 285 to process data and that includes a biller data processor configured to process financial related data associated with payment-related requests (e.g., payments, requests to void transactions, cancellations, escrow requests, etc.). For instance, external system 202 may be a separate financial entity (e.g., a credit union) that is separate or unaffiliated with the financial entity associated with external system 204. The external systems 202, 204 as well as the computing system 206 may be in communication and transact data via the network 258. The network 258 may include or be associated with, according to one example, an automated clearing house network of an automated clearing house (ACH) that is used for the transfer of electronic funds. Various other external systems, although not shown, may also be in communication with computing system 206.

According to various embodiments, the various external systems (e.g., external systems 202 and 204) may each represent a separate financial entity. According to various embodiments, the external systems may have one or more accounts associated with the user. For example, if the billing entity is a bank and the user has multiple accounts with the bank (e.g., due to having checking accounts, savings accounts, cash deposit accounts, etc.) then there may be multiple accounts that are associated with the user and corresponding to that specific financial entity.

The computing system 206 includes an example processing device 220 that includes an aggregator system 221 (e.g., a payment aggregator system). According to one embodiment, the aggregator system 221 includes a processing engine 223 (e.g., a payment processing engine) and an administration manager 225. According to one embodiment, the processing engine 223 is configured to interact with a user device (e.g., user device 104, 106) and the external system(s) 202, 204 corresponding to specific billing entities. The processing engine 223 may include a web server (and/or corresponding structures providing web server functionalities) that hosts webpages of a financial entity (e.g., a bank). The aggregator system 221 may generate data to present on a user interface (e.g., display 140) of a user device 104, 106 via a digital platform (e.g., an entity website).

For example, the aggregator system 221 may generate a virtual aggregation table of stored recurring electronic processes (e.g., financial transactions), where each stored recurring electronic process has associated therewith stored interaction-based authentication data (e.g., account number, bank identification number (BIN), user ID, password, or various authentication related data that is specific to the recurring electronic process). In particular, the aggregator system 221 aggregates various entities that may receive a payment from the user such that the user may effectuate payment to multiple entities (e.g., unrelated or unaffiliated entities) via a single digital platform. An example virtual aggregation table may store data (including interaction-based authentication data) specific to the user (e.g., user 110) for multiple entities (e.g., a user account for a streaming service provider, a user's credit card account, a user account for dance lessons, a user account for a cell phone provider, a user account for a mortgage service, a user account for an electricity service, etc.) and simultaneously display, via a digital platform, selectable options (e.g., a list of each respective entity and a selectable checkbox next to each respective entity) corresponding to each entity to which a user may make a payment.

In particular, the processing engine 223 may facilitate displaying, via the user interface, an aggregation of optional user interactions for the user to perform via the digital platform, where each optional user interaction is selected from optional external funding sources from which a resource transfer can be made, where the optional funding sources incorporate the one or more data entries of a virtual aggregation table that is automatically populated by the aggregator system 221. In one non-limiting example, the aggregator system 221 may automatically populate one or more data entries of a virtual aggregation table that is configured to store data records of external source identification information, where the aggregator system 221 stores identifying information data about one or more external sources.

Processing engine 223 can be configured to receive, via user device 104, 106 data representing a selected optional external source that was selected based on the user selecting a selectable input displayed, via user interface 109 (e.g., a touch screen). According to one embodiment, the processing engine 223 performs the resource transfer to an optional external source associated with the selectable input selected. For instance, the processing engine 223 may effectuate a financial transfer from a first source (e.g., bank account) to a second source (e.g., bank account).

Figure 1C:
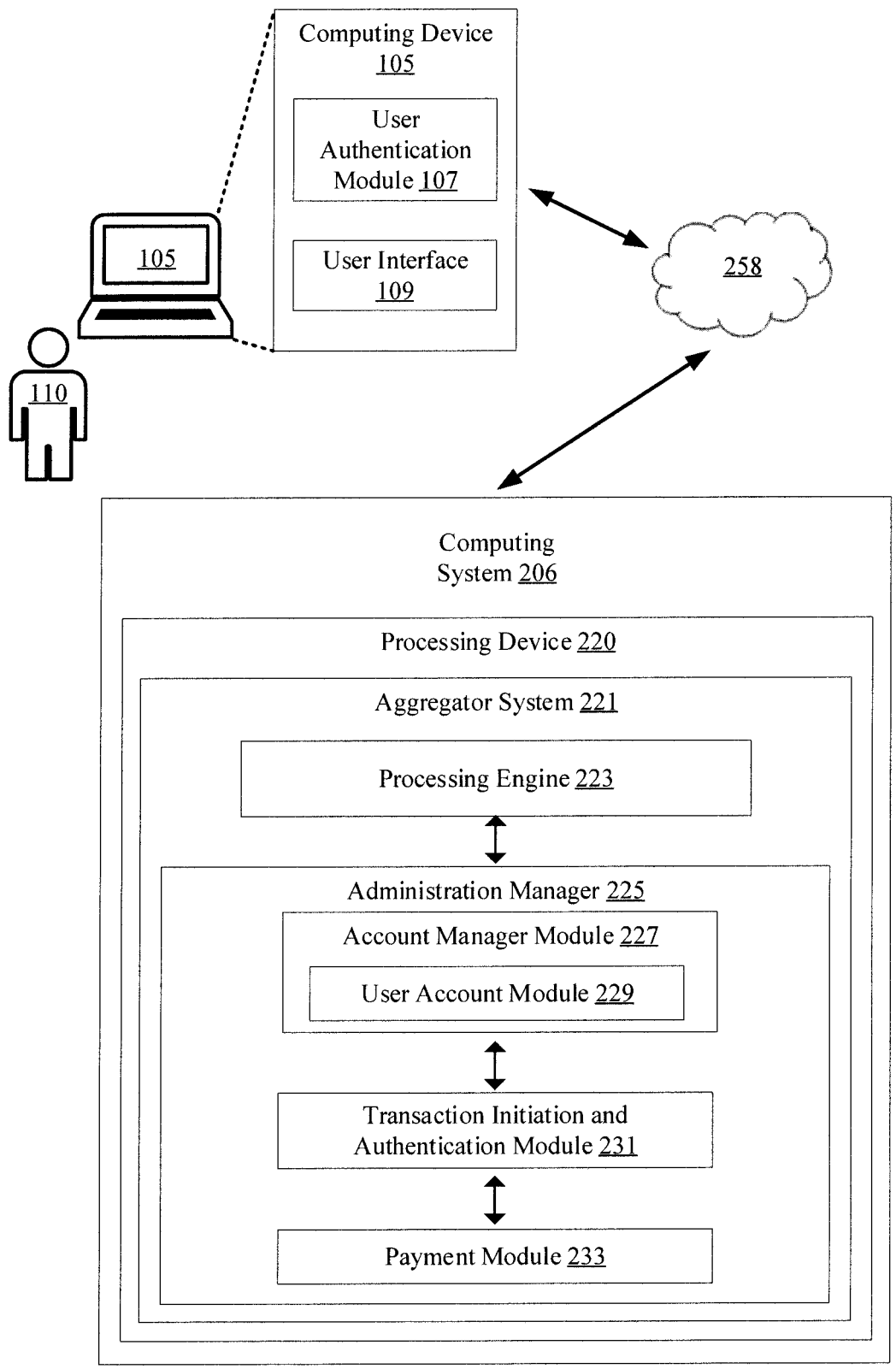
FIG. 1C depicts an example computing device in communication with a computing system for data aggregation incorporating authentication data, in accordance with an embodiment of the present invention.

FIG. 1C depicts an example computing device 105 (e.g., user device 104, 106) in communication with the computing system 206 for data aggregation incorporating authentication data, in accordance with an embodiment of the present invention. The computing system 206 may include a processing device 220 that includes a processing engine 223 that includes, according to one embodiment, an authorization server that performs payment authorization functions. In particular, the processing engine 223 may be configured to send and receive identifying information data about one or more external sources, where the identifying information data includes user-specific authentication information data.

The computing system 206 may be in communication with the computing device 105 via the network 258 (e.g., a payment processor network). According to one embodiment, the computing device 105 may include a user authentication module 107 configured to authenticate users using various workflows. The user authentication module 107 may be configured to process interaction-based authentication data of a user 110 to ensure that the user 110 is authorized to perform a user interaction. The interaction-based authentication data may be processed, via the user authentication module 107 in communication with one or more authentication systems described herein and/or using one or more authentication processes described herein. The user authentication module 107 may incorporate or include a database schema supporting authentication of the user 110 and may facilitate, according to various embodiments, registration of new users, sending confirmation emails/text messages/phone calls/etc., providing secure options for recovering forgotten authentication passwords, and defining roles/permissions based on various authentication information and permissions. The user authentication module 107 may be in communication with a user interface 109 (e.g., a camera) that may be used to authenticate a user via, for example, biometric data (e.g., facial feature recognition) or various other authentication processes described herein.

Further, the processing engine 223 may be in communication with an administration manager 225, which may include an account manager module 227 associated with various user accounts. In one example, the account manager module 227 may include a user account module 229 (specifically associated with the user 110) that is configured to process authentication data associated with the user. Further, the administration manager 225 may include a transaction initiation and authentication module 231 that may be configured to authenticate the credential data submitted with a payment authorization request including, for example, data sent to specifically authenticate the transaction and, based on the authorization data being authenticated, initiate the transaction. The credential data may include, for example, the transaction amount, transaction date, transaction ID, primary account number, account expiration date, BIN, a merchant category code, a merchant of record name and location, and various other information related to the characteristics of the transaction, the computing device itself 105, user account numbers, card verification values (CVV), cardholder authentication verification values, chip cryptogram, CVV2, etc. Further, the transaction initiation and authentication module 231 may process data elements for fraud algorithms such as, for example, geo-location data, a wallet ID, registered user status, etc.

According to various embodiments, the transaction module 231 may facilitate processing transaction initiation mode data elements, which may identify which transaction initiation mode was used to initiate the payment transaction. For instance, the transaction itself may be assigned a value and may be received as part of a payment authorization request or may be received separately from the payment authorization request. Example transaction initiation mode data elements may include a unique payment service provider or digital wallet provider ID that would be needed to initiate the transaction.

The administration manager 225 may also include a payment module 233 that includes a group of payment features and settings that may be made available to the computing system 206 by third party external systems (e.g., external system 202 or external system 204). According to one embodiment, the payment module 233 may utilize a real-time payment gateway (e.g., a direct payment/transfer of funds from a bank) or an off-line payment gateway (e.g., a check payment, cash on delivery) associated with a financial transaction that is not effectuated until a later time, for example, when the user 110 picks up the item purchased from the physical store/location.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 201 referenced in FIG. 2A) may include a topography with a hidden layer 205 between an input layer 203 and an output layer 207. The input layer 203, having nodes commonly referenced in FIG. 2A as input nodes 209 for convenience, communicates input data, variables, matrices, or the like to the hidden layer 205, having nodes 211. The hidden layer 205 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 209 of the input layer, which then communicates the data to the hidden layer 205. The hidden layer 205 may be configured to determine the state of the nodes in the respective layers and assign weight coefficients or parameters of the nodes based on the edges separating each of the layers, e.g., an activation function implemented between the input data communicated from the input layer 203 and the output data communicated to the nodes 213 of the output layer 207. It should be appreciated that the form of the output from the neural network may generally depend on the type of model represented by the algorithm. Although the feedforward network 201 of FIG. 2A expressly includes a single hidden layer 205, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
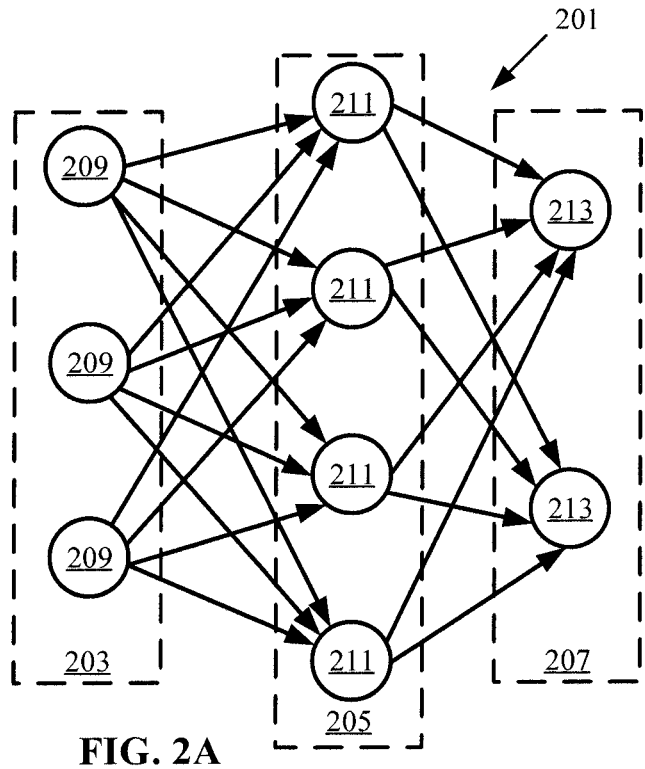
FIG. 2A is a diagram of a feedforward network, according to at least one embodiment, utilized in machine learning.
Figure 2C:
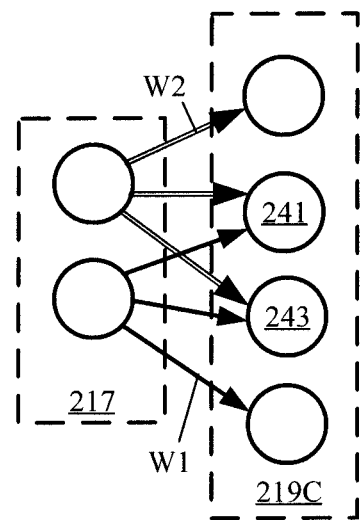
FIG. 2C is a diagram of a portion of the convolution neural network of FIG. 2B, according to at least one embodiment, illustrating assigned weights at connections or neurons.
Figure 2B:
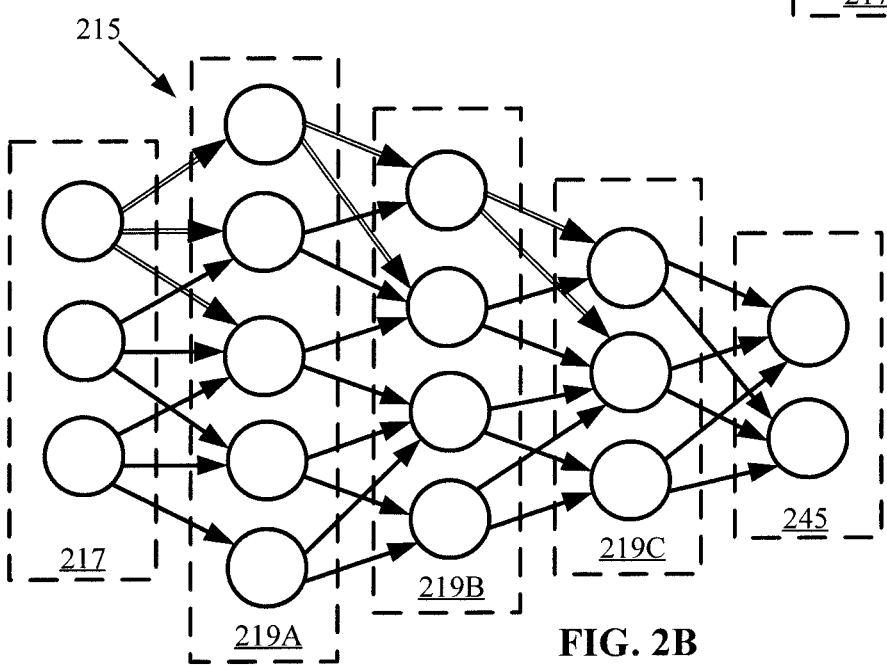
FIG. 2B is a diagram of a convolution neural network, according to at least one embodiment, utilized in machine learning.

An exemplary convolutional neural network (CNN) 215 is depicted and referenced in FIG. 2B. As in the basic feedforward network 201 of FIG. 2A, the illustrated example of FIG. 2B has an input layer 217 and an output layer 286. However where a single hidden layer 205 is represented in FIG. 2A, multiple consecutive hidden layers 219A, 219B, and 219C are represented in FIG. 2B. The edge neurons represented by white-filled arrows highlight that hidden layer nodes can be connected locally, such that not all nodes of succeeding layers are connected by neurons. FIG. 2C, representing a portion of the CNN 215 of FIG. 2B, specifically portions of the input layer 217 and the first hidden layer 219A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
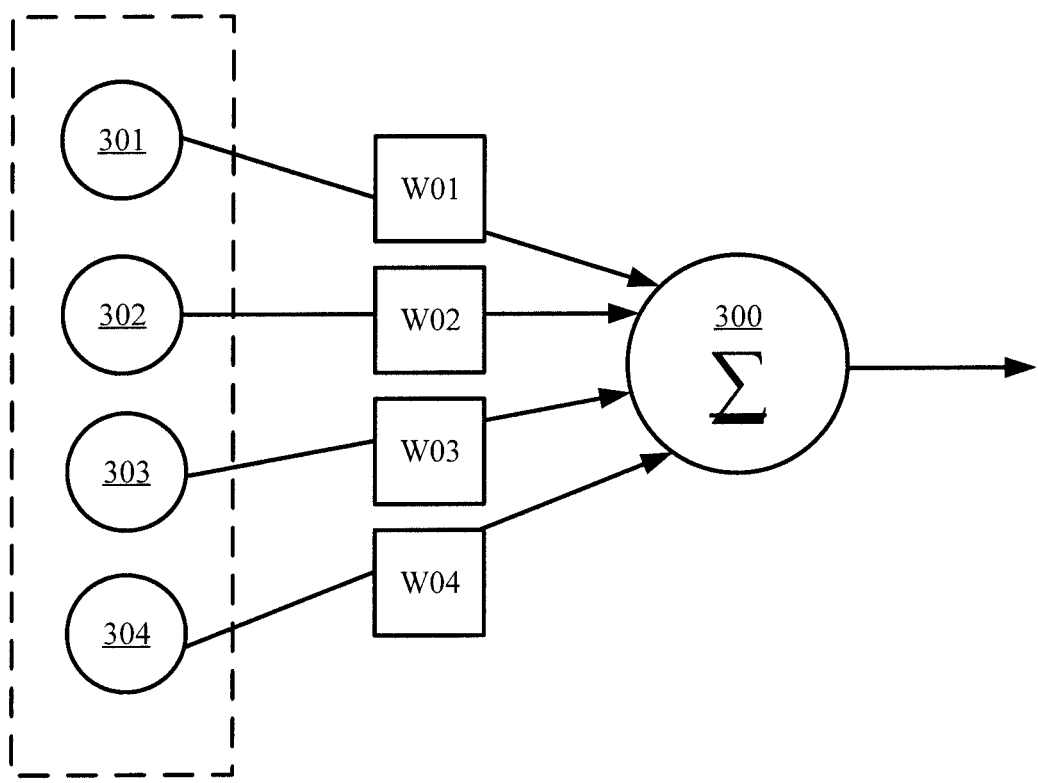
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
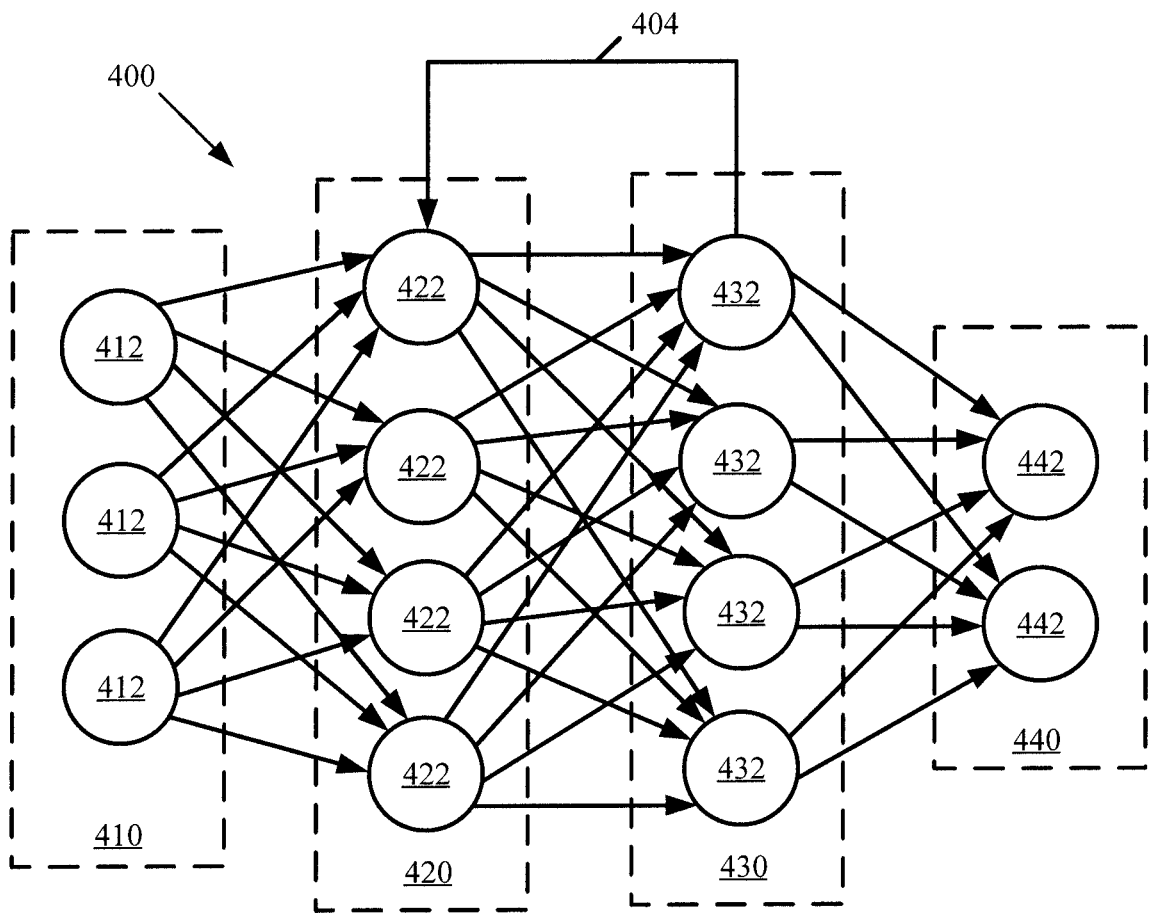
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 201 of FIG. 2A, the illustrated example of FIG. 4 has an input layer 410 (with nodes 412) and an output layer 440 (with nodes 442). However, where a single hidden layer 205 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes).

Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 5:
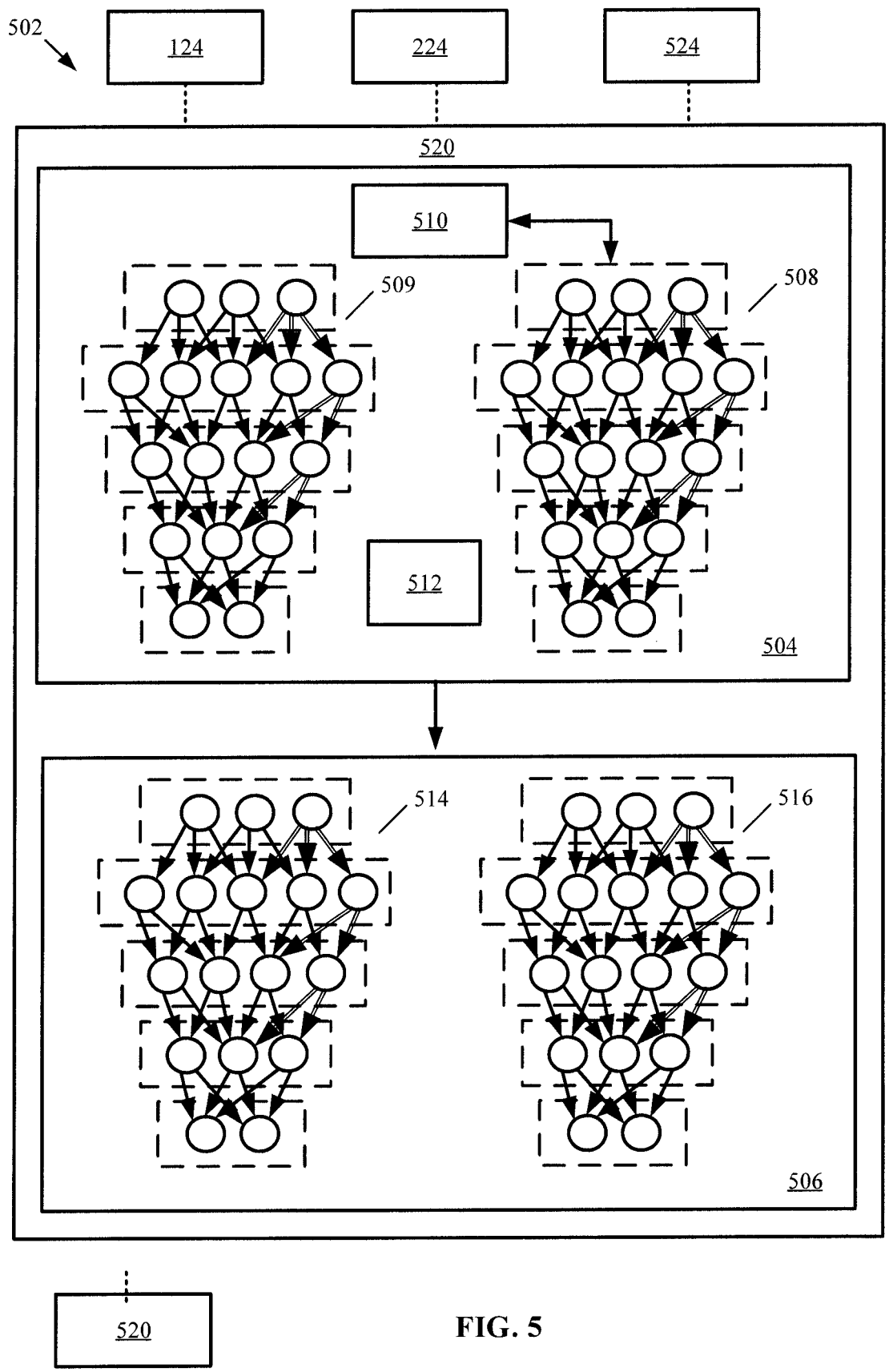
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, processing device 285, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
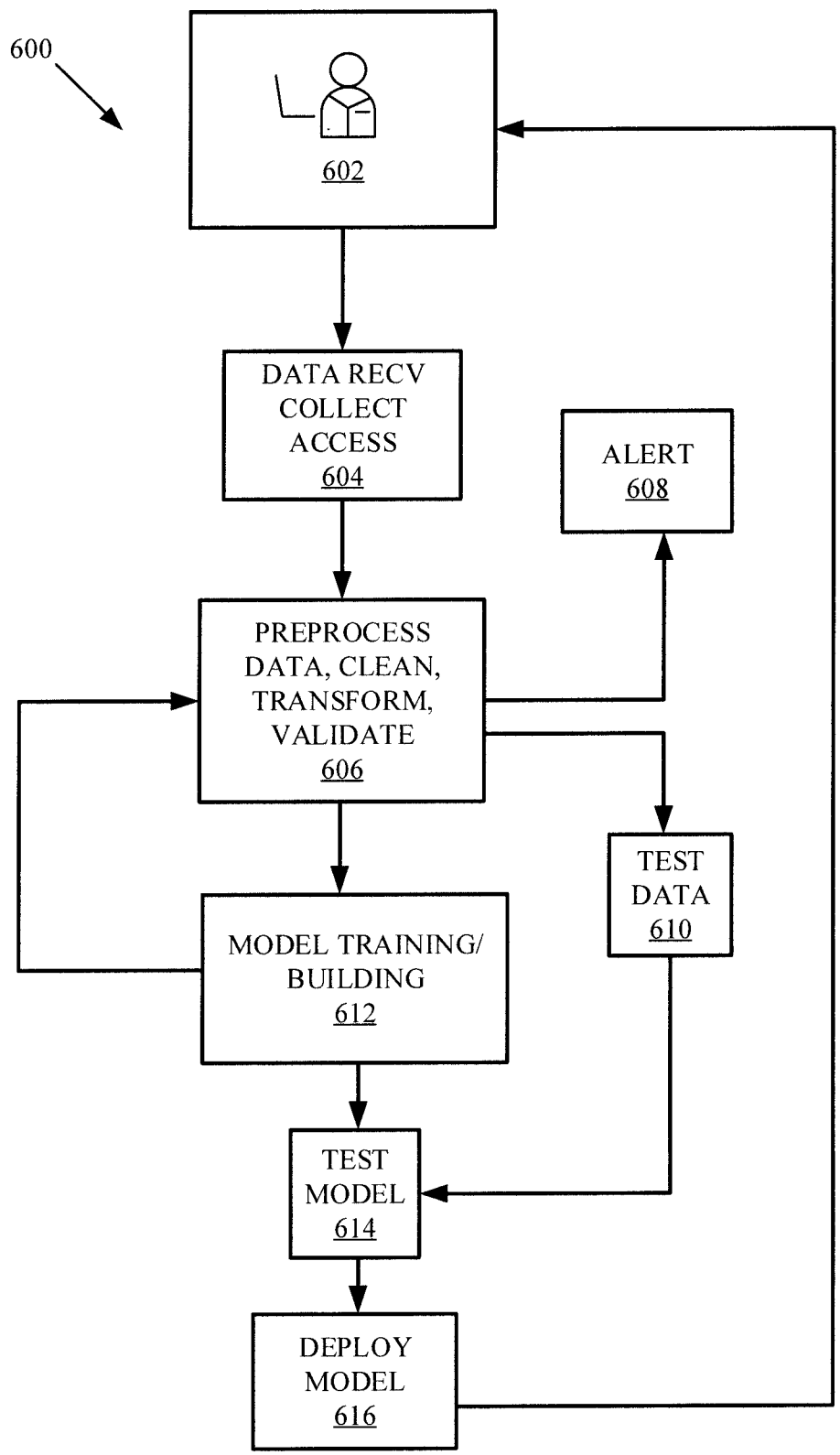
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Disclosed herein are system and methods that utilize a payment aggregator to aggregate information about external funding accounts that may be used to make a financial transfer from the external funding account to a financial entity's funding account. The external funding account may be identified via various methods and systems. For instance, a soft credit pull of a customer may be performed to determine which financial institutions and entities may have accounts for that customer. Additionally or alternatively, a computing system may determine that external funding accounts have been used to pay the customer's bills, and information about those external funding accounts may be analyzed to determine whether the external funding account belongs to the user. If such accounts belong to the user, the payment aggregator may include information about those accounts in a virtual aggregation table so that those accounts may be selected as optional sources for making a payment or transferring money from one account to another.

Figure 7:
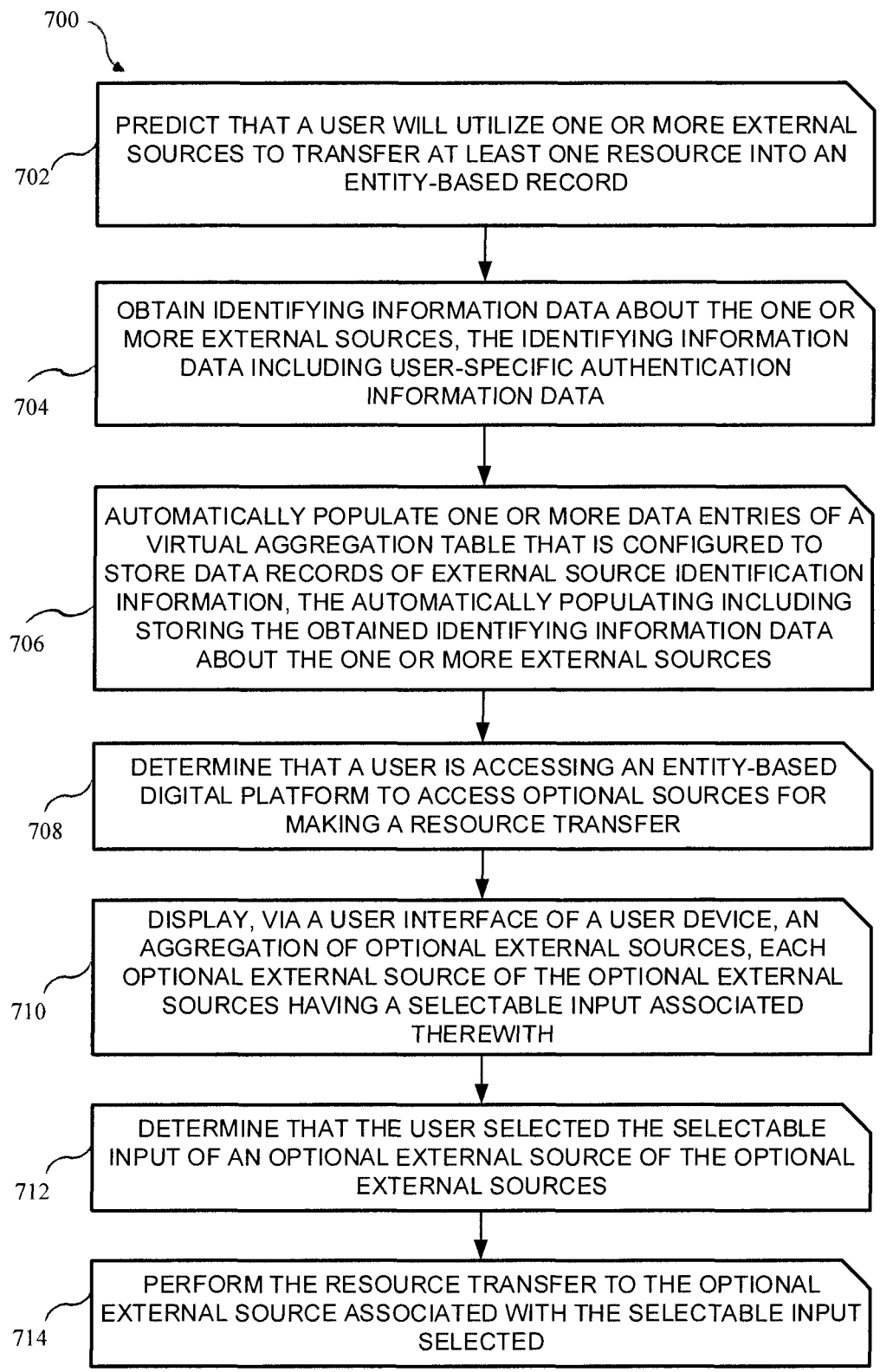
FIG. 7 depicts a block diagram of an example method for data aggregation incorporating authentication data, in accordance with an embodiment of the present invention.

FIG. 7 depicts a block diagram of an example method 700 for data aggregation incorporating authentication data, in accordance with an embodiment of the present invention. At block 702, the system predicts that a user will utilize one or more external sources to transfer at least one resource into an entity-based record. For instance, a financial entity system may predict that a current customer will utilize one or more external funding sources (e.g., bank accounts) to transfer funds into an account associated with an entity. According to various embodiments, one or more external sources are identified to be associated with a user by performing a credit check on the user. For example, the system may access information about the customer via a credit check, which may identify bank accounts of the customer, or based on identifying payment sources of payments made by the customer. The system may predict that these sources may be used in the future to make a payment or as a source for transferring money. Additionally, the predicting may include determining that one or more external sources include resources to transfer. These predictions may incorporate any of the machine learning and/or artificial intelligence processes described herein.

At block 704, the system obtains identifying information data about one or more external sources, where the identifying information data may include user-specific authentication information data. For instance, the identifying information data about one or more external sources may include a routing number of a financial entity, a standard format business identifier (BIN) code identifying a financial entity, branch information about a bank branch, a name of the financial entity, an address of the financial entity, etc. Further, the user-specific authentication information data may include various authentication information identifying the user such as, for example, bank account information of the user (e.g., a bank account number), a social security number of the user, a name of the user, an address of the user, etc.

At block 706, the system automatically populates one or more data entries of a virtual aggregation table that is configured to store data records of external source identification information, where automatically populating one or more data entries includes storing the obtained identifying information data about one or more external sources. The virtual aggregation table may be populated via a payment aggregator. Advantageously, the payment aggregator provides a streamlined funding solution by eliminating the need to log in to various platforms, applications, websites, etc. of various entities to make transfers or payments from each individual entity. Specifically, the payment aggregator described herein facilitates performing a large volume of small financial transfers from many sources without requiring the user to individually set up or input user information associated with each source. Specifically, the computing system incorporates AI and machine learning to determine whether a source should be included in the virtual aggregation table.

At block 708 the system determines that a user is accessing an entity-based digital platform to access optional sources for making a resource transfer. For instance, the system may determine that the customer/user has logged in to the digital platform (e.g., website) of the financial entity and has been directed to a webpage that provides payment aggregation information that may be used to access optional sources for making a resource transfer of money from one financial entity to another entity (e.g., a financial entity or to pay a bill).

At block 710, the system displays, via a user interface of a user device, an aggregation of optional external sources, each optional external source of the optional external sources having a selectable input associated therewith. For instance, the webpage may display optional external sources that may be used to fund a payment or transfer. The webpage may include a selectable input associated with each external source such as, for example, a check box that can be selected by the user to indicate whether an external source should be used to make a financial payment or transfer. According to various embodiments, a user may be able to select multiple sources for the payment or transfer. In other embodiments, a user may only be able to select one source at a given time to make the payment or transfer.

At block 712 the system determines that the user selected the selectable input of an optional external source, and at block 714, the system performs the resource transfer to the optional external source associated with the selectable input selected.

Figure 8:
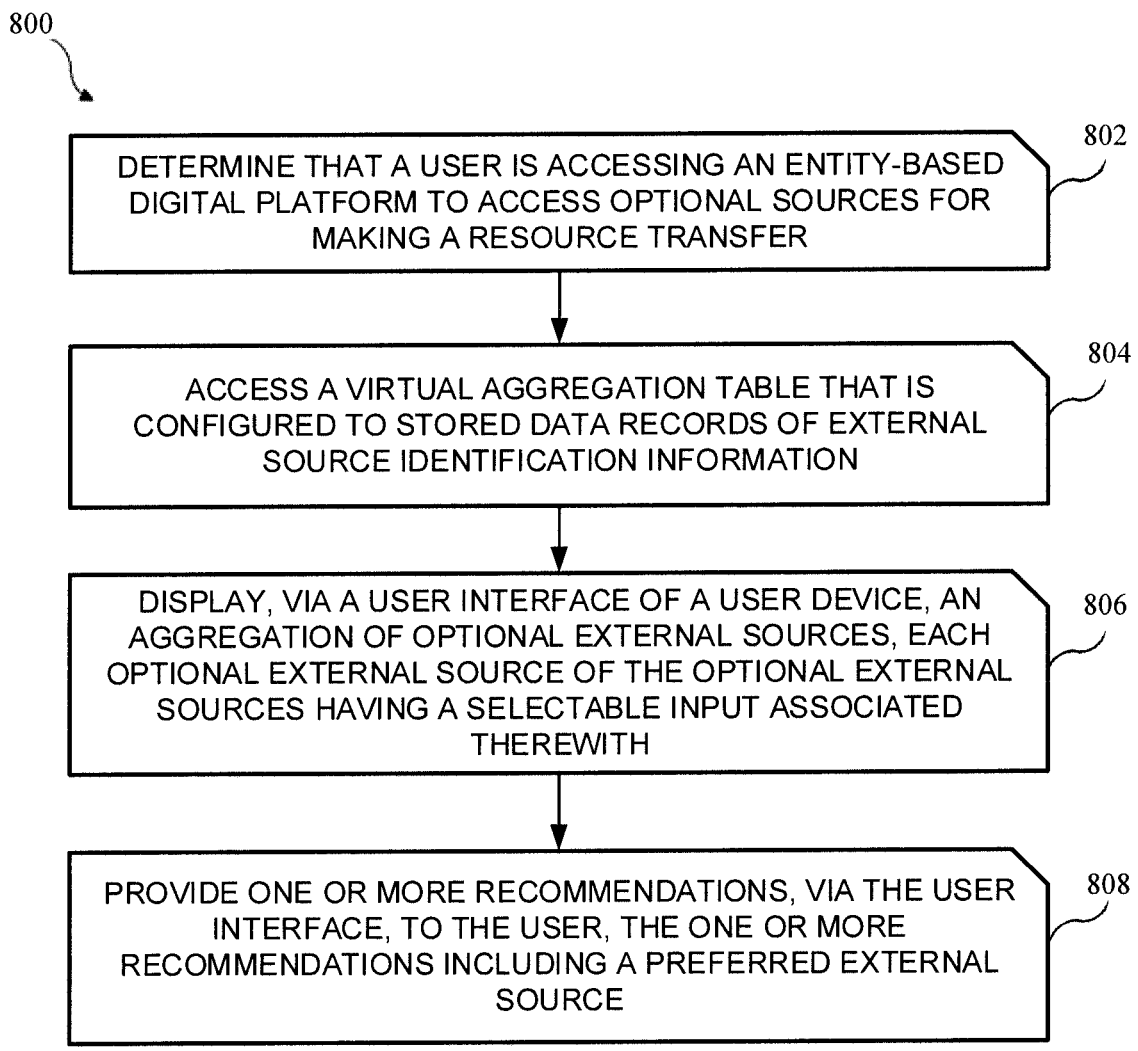
FIG. 8 depicts a block diagram of an example method for data aggregation incorporating authentication data, in accordance with an embodiment of the present invention.

FIG. 8 depicts a block diagram of an example method 800 for data aggregation incorporating authentication data, in accordance with an embodiment of the present invention. At block 802 the system determines that a user is accessing an entity-based digital platform to access optional sources for making a resource transfer. At block 804, the system accesses a virtual aggregation table that is configured to store data records of external source identification information. At block 806 the system displays, via a user interface of a user device, an aggregation of optional external sources, with each optional external source of the optional external sources having a selectable input associated therewith. At block 808, the system provides one or more recommendations, via the user interface, to the user, the one or more recommendations including a preferred external source. According to various embodiments, the preferred external source may be selected based on having a comparatively lowest balance transfer fee. For example, to make a payment via credit card some entities charge an additional processing fee, so the preferred external source that is identified might not have a transfer/processing fee to make the balance transfer. In another example, sometimes banks may charge a fee to transfer funds to or from an external bank account. The preferred external source may compare the transfer fees for each external source and identify the external source that would have the lowest transfer fees. Thus, this source with the lowest transfer fee may be determined by the system to be the preferred external source of the financial transfer.

Figure 9:
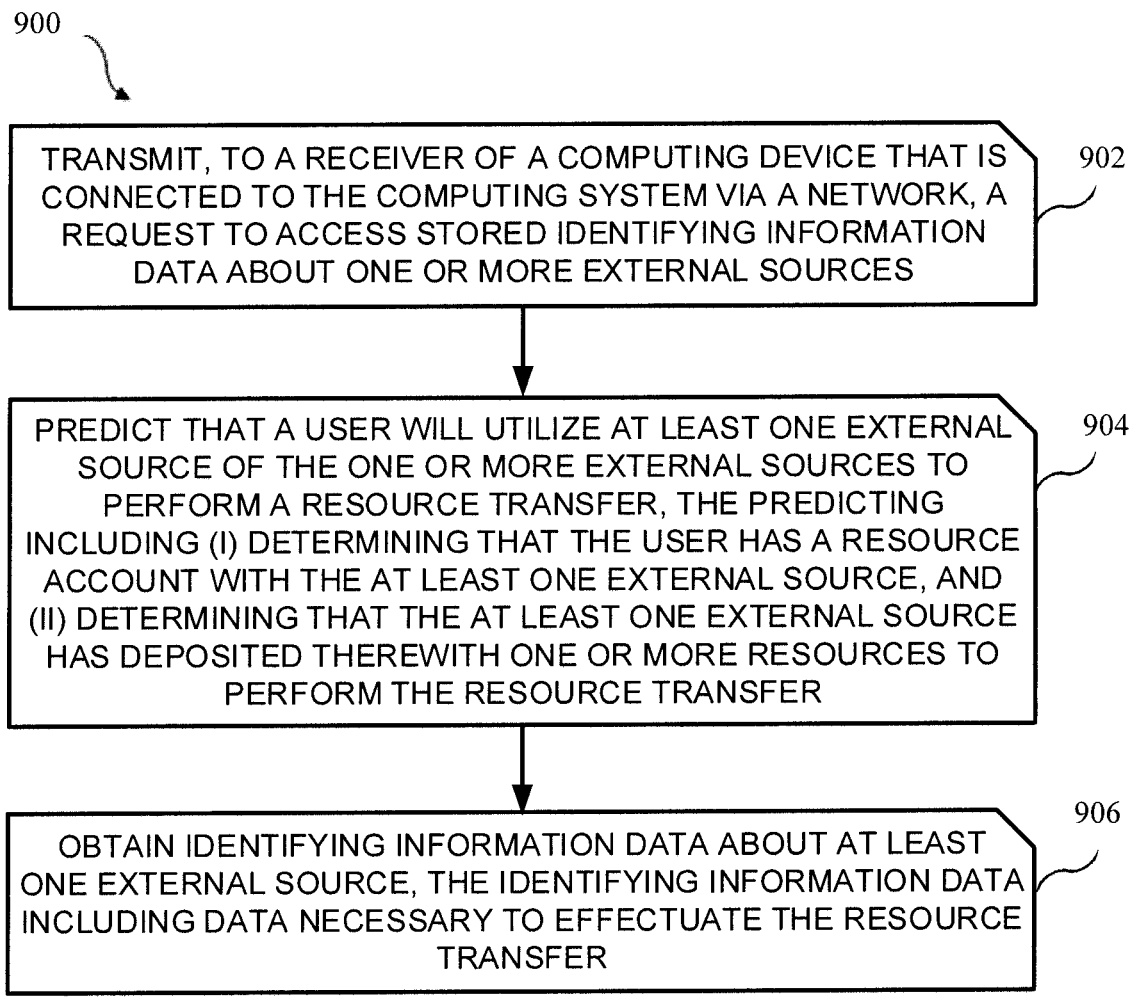
FIG. 9 depicts a block diagram of an example method for data aggregation incorporating authentication data, in accordance with an embodiment of the present invention.

FIG. 9 depicts a block diagram of an example method 900 for data aggregation incorporating authentication data, in accordance with an embodiment of the present invention. At block 902, the system transmits, to a receiver of a computing device that is connected to the computing system via a network, a request to access stored identifying information data about one or more external sources. At block 904, the system predicts that a user will utilize at least one external source of the one or more external sources to perform a resource transfer, the predicting including (i) determining that the user has a resource account with the at least one external source, and (ii) determining that the at least one external source has deposited therewith one or more resources to perform the resource transfer. According to various embodiments, predicting that the user will utilize at least one external source may include modeling, via a computer-implemented modeling process, identifying information data, where the modeling determines a likelihood that the user will utilize at least one external source to perform a resource transfer. At block 906, the system obtains identifying information data about at least one external source, where the identifying information data includes data (e.g., bank account information, user information, etc.) necessary to effectuate the resource transfer.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computing system for aggregated authenticated data storage, the system comprising:
   a memory;
   one or more processors in communication with the memory; and
   program instructions executable by the one or more processors via the memory to:
      predict that a user will utilize one or more external sources to transfer at least one resource into an entity-based record;
      obtain identifying information data about the one or more external sources, the identifying information data including user-specific authentication information data;
      automatically populate one or more data entries of a virtual aggregation table that is configured to store data records of external source identification information, the automatically populating including storing the obtained identifying information data about the one or more external sources;
      determine that a user is accessing an entity-based digital platform to access optional sources for making a resource transfer; and
      display, via a user interface of a user device, an aggregation of optional external sources, each optional external source of the optional external sources having a selectable input associated therewith.

2. The computing system for aggregated authenticated data storage of claim 1, wherein the program instructions further identify the one or more external sources are associated with the user, wherein the identifying includes performing a credit check on the user.

3. The computing system for aggregated authenticated data storage of claim 1, wherein the predicting that a user will utilize the one or more external sources includes determining that the one or more external sources include resources to transfer.

4. The computing system for aggregated authenticated data storage of claim 1, wherein the identifying information data that is obtained includes a routing number of a financial entity.

5. The computing system for aggregated authenticated data storage of claim 1, wherein the identifying information data that is obtained includes a standard format business identifier code identifying a financial entity.

6. The computing system for aggregated authenticated data storage of claim 1, wherein the user-specific authentication information data includes bank account information of the user.

7. The computing system for aggregated authenticated data storage of claim 1, wherein the user-specific authentication information data includes authentication information identifying the user.

8. The computing system for aggregated authenticated data storage of claim 1, wherein the program instructions further provide one or more recommendations, via the user interface, to the user, the one or more recommendations including a preferred external source.

9. The computing system for aggregated authenticated data storage of claim 8, wherein the preferred external source is selected based on having a comparatively lowest balance transfer fee.

10. The computing system for aggregated authenticated data storage of claim 1, wherein the program instructions further determine that the user selected the selectable input of an optional external source.

11. The computing system for aggregated authenticated data storage of claim 10, wherein the program instructions further perform the resource transfer to the optional external source associated with the selectable input selected.

12. A computing system for aggregated authenticated data storage, the system comprising:
a memory;
one or more processors in communication with the memory; and
program instructions executable by the one or more processors via the memory to:
transmit, to a receiver of a computing device that is connected to the computing system via a network, a request to access stored identifying information data about one or more external sources;
predict that a user will utilize at least one external source of the one or more external sources to perform a resource transfer, the predicting including (i) determining that the user has a resource account with the at least one external source, and (ii) determining that the at least one external source has deposited therewith one or more resources to perform the resource transfer.

13. The computing system for aggregated authenticated data storage of claim 12, wherein the program instructions obtain identifying information data about the at least one external source.

14. The computing system for aggregated authenticated data storage of claim 12, wherein the predicting that the user will utilize the at least one external source includes modeling, via a computer-implemented modeling process, the identifying information data, the modeling determining a likelihood that the user will utilize the at least one external source to perform the resource transfer.

15. A computer-implemented method for aggregated authenticated data storage, the computer-implemented method comprising:
predicting that a user will utilize one or more external sources to transfer at least one resource into an entity-based record;
obtaining identifying information data about the one or more external sources, the identifying information data including user-specific authentication information data;
automatically populating one or more data entries of a virtual aggregation table that is configured to store data records of external source identification information, the automatically populating including storing the obtained identifying information data about the one or more external sources;
determining that a user is accessing an entity-based digital platform to access optional sources for making a resource transfer; and
displaying, via a user interface of a user device, an aggregation of optional external sources, each optional external source of the optional external sources having a selectable input associated therewith.

16. The computer-implemented method for aggregated authenticated data storage of claim 15, further comprising identifying the one or more external sources are associated with the user, wherein the identifying includes performing a credit check on the user.

17. The computer-implemented method for aggregated authenticated data storage of claim 15, wherein the predicting that a user will utilize the one or more external sources includes determining that the one or more external sources include resources to transfer.

18. The computer-implemented method for aggregated authenticated data storage of claim 15, wherein the identifying information data that is obtained includes a routing number of a financial entity.

19. The computer-implemented method for aggregated authenticated data storage of claim 15, wherein the identifying information data that is obtained includes a standard format business identifier code identifying a financial entity.

20. The computer-implemented method for aggregated authenticated data storage of claim 15, wherein the user-specific authentication information data includes bank account information of the user.

* * * * *